US012719756B2

(12) United States Patent
Kohli et al.

(10) Patent No.: US 12,719,756 B2
(45) Date of Patent: Aug. 25, 2026

(54) DEVICE TAGGING WITH TAG QUERY

(71) Applicant: Arista Networks, Inc., Santa Clara, CA (US)

(72) Inventors: Gursimran Singh Kohli, Coquitlam (CA); Grzegorz Kacy, Vancouver (CA)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/462,323

(22) Filed: Sep. 6, 2023

(65) Prior Publication Data

US 2025/0080427 A1 Mar. 6, 2025

(51) Int. Cl.
*H04L 41/12* (2022.01)
*H04L 41/02* (2022.01)

(52) U.S. Cl.
CPC ............ *H04L 41/12* (2013.01); *H04L 41/024* (2013.01)

(58) Field of Classification Search
CPC .... H04L 41/12; H04L 41/024; H04L 41/0853
See application file for complete search history.

(56) References Cited

U.S. PATENT DOCUMENTS

2023/0161961 A1* 5/2023 Picinini ................. G06F 16/953 715/230
2024/0362289 A1* 10/2024 Morrison ............ G06F 16/2456
2025/0103834 A1* 3/2025 Kowalski ............. G06K 7/1417

* cited by examiner

*Primary Examiner* — Farzana B Huq
(74) *Attorney, Agent, or Firm* — Treyz Law Group, P.C.; Tianyi He

(57) ABSTRACT

A network management system may associate devices with informational tags to facilitate network organization and management. The network management system may obtain a tag query and process the obtained tag query to generate corresponding output such as a device tag state that satisfies the tag query. To enable efficient and scalable processing of the tag query, the network management system may standardize the tag query and process the standardized tag query.

18 Claims, 9 Drawing Sheets

| TAG QUERY 1: tag1 AND tag2 AND tag3 | | | |
| --- | --- | --- | --- |
| tag1 | tag2 | tag3 | QUERY OUTPUT |
| F | F | F | F |
| F | F | T | F |
| F | T | F | F |
| F | T | T | F |
| T | F | F | F |
| T | F | T | F |
| T | T | F | F |
| T | T | T | T |

| TAG QUERY 2: (tag1 OR tag2) AND tag3 | | | |
|---|---|---|---|
| tag1 | tag2 | tag3 | QUERY OUTPUT |
| F | F | F | F |
| F | F | T | F |
| F | T | F | F |
| F | T | T | T |
| T | F | F | F |
| T | F | T | T |
| T | T | F | F |
| T | T | T | T |

DEVICE TAGGING WITH TAG QUERY

BACKGROUND

This relates to a networking system, and more particularly, to informational tags for network devices.

The networking system can include a management device that associates network devices with informational tags that convey corresponding information for the network devices. These tags can be used to facilitate organization and management of the network devices and for other functions.

DETAILED DESCRIPTION

Figure 1:
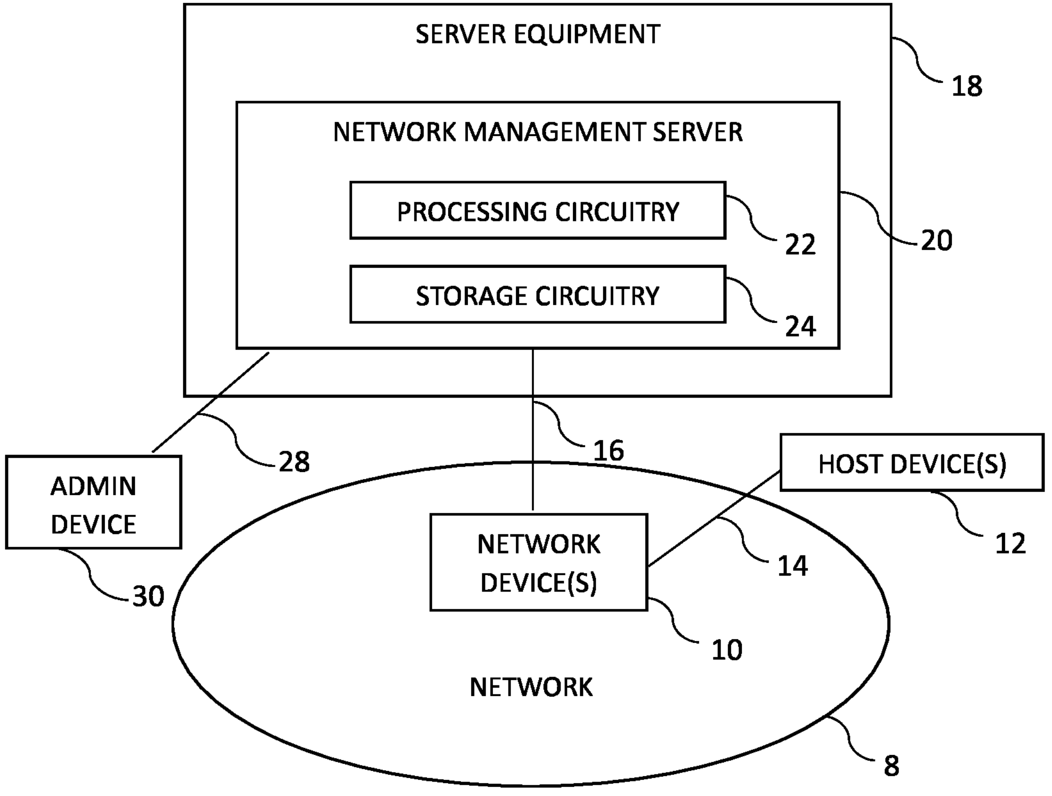
FIG. 1 is a diagram of a networking system having a management system and network devices in accordance with some embodiments.

A network can convey network traffic (e.g., in the form of one or more packets, one or more frames, etc.) between host devices. To properly forward the network traffic, the network can include a number of network devices. These network devices or other devices in the networking system can each be associated with one or more informational tags (sometimes referred to herein as tags or labels) to facilitate improved network organization and case of network management. The informational tags may each be indicative of a (networking-relevant) piece of information regarding the tagged device. Configurations in which a management system (e.g., a management server, one or more network controller devices, and/or one or more network devices implementing network management functions) associates different devices in the network with different sets of informational tags (e.g., store these device-tag associations) to perform network (device) management are sometimes described herein as an illustrative example. If desired, other devices or generally other equipment (e.g., other servers that perform non-network-management functions) in the networking system may perform and/or store these device-tag associations and perform corresponding processing based on the device-tag associations to facilitate other applications.

In one illustrative configuration, the management system can receive a tag-based query (sometimes referred to as a tag query) containing informational tag(s) as an input and can output information based on the input tag query. However, the processing of the tag queries and other tag-query-based functions of the management system may be limited by the complexity of the input tag query. In other words, as the complexity of the input tag query increases, the performance of processing the input tag query may degrade significantly.

Accordingly, it may be desirable to provide a mechanism with which any tag query, even complex tag queries, may be efficiently processed by the management system. In particular, to facilitate efficient processing of tag queries, the management system may standardize (e.g., simplify) the received input tag query and/or provide a canonical (standardized) form of the input tag query. Standardizing (e.g., simplifying) the input tag query may enable the management system to not only generate an output to the tag query in a more efficient and scalable manner but also enable further applications that build on the efficient and scalable processing of a tag query.

As one illustrative example of further applications, the management system may perform device tagging (e.g., associating one or more devices with corresponding informational tags) based on device tag states derived from the canonical form of the input tag query. In particular, a (complex) tag query may be standardized into a canonical form from which a set of device tag states satisfying the tag query can be obtained. A given device tag state may be used to inform the tagging of the network device, and if desired, the device configuration of the network device based on the tags. Configurations in which the management system updates the device tag state of one or more devices based on standardizing an input tag query are described herein as an illustrative example. If desired, any suitable applications may similarly leverage the standardization (e.g., simplification) process of the tag query that facilitates more efficient and scalable processing of tag queries.

An illustrative networking system in which devices in a network are tagged with informational tags for network management at a management system is shown in FIG. 1. As shown in FIG. 1, the networking system may include a network such as network 8. Network 8 may be of any suitable scope and/or form part of a larger network of any suitable scope. As examples, network 8 may include, be, and/or form part of one or more local segments, one or more local subnets, one or more local area networks (LANs), one or more campus area networks, a wide area network, etc. Network 8 may include any suitable number of different network devices 10 that connect corresponding host devices 12 of network 8 to one another. If desired, network 8 may include and/or be coupled to internet service provider networks (e.g., the Internet) or other public service provider networks, private service provider networks (e.g., multiprotocol label switching (MPLS) networks), and/or other types of networks such as telecommunication service provider networks (e.g., a cellular network based on one or more standards as described in the 3GPP specifications such as GSM, UMTS, LTE, 5G, etc.).

Network devices 10 may each include or be a switch (e.g., a multi-layer L2/L3 switch), a bridge, a router, a gateway, a hub, a repeater, a firewall, a wireless access point, a network device serving other networking functions, a network device that includes the functionality of two or more of these devices, a network controller or management device that controls the operation of one or more of these network devices, and/or other types of network devices. In one illustrative arrangement, network devices 10 may include routers, spine switches, and leaf (e.g., top-of-rack) switches implemented at multiple network domains (e.g., at multiple geographically different sites).

Host devices 12 (sometimes referred to herein as host equipment 12) serving as end hosts of (edge or leaf) network devices 10 may each include or be a computer, a server or virtual machine implemented on server equipment, a portable electronic device such as a cellular telephone, a laptop, etc., a network service and/or storage device, network controller or management equipment that manages and controls the operation of one or more of host devices and/or network devices, and/or any other suitable types of specialized or general-purpose host computing equipment, e.g., running one or more client-side and/or server-side applications. If desired, host devices 12 may include Internet-of-Things (IoT) devices such as network-connected appliances or device such as cameras, thermostats, wireless sensors, medical or health sensors which are sometimes referred to as Internet-of-Medical-Things (IOMT) devices, or other sensors, lighting fixtures, speakers, printers, or other output devices, controllers or other input devices, and other network-connected equipment that serve as input-output devices and/or computing devices in the distributed networking system. In one illustrative arrangement, at least some of these end host devices 12 may be implemented on server equipment (e.g., forming compute servers, storage servers, and/or management servers) across multiple network domains (e.g., at multiple geographically different sites).

Respective network paths 14 may couple network devices 10 within network 8 to each other and/or may couple one or more (edge or leaf) network devices 10 to host devices 12. Network paths 14 connecting different devices of network 8 (e.g., connecting network devices 10 to each other, connecting network devices 10 to end host devices 12, etc.) may be formed from one or more wired technologies or standards such as Ethernet (e.g., using copper cables and/or fiber optic cables), thereby forming a wired network portion of network 8. If desired, network 8 may also include one or more wireless network portions (e.g., where network paths 14 are formed from one or more wireless links) that extend from the wired network portion.

The networking system of FIG. 1 may include server equipment 18 on which network management server 20 is implemented. In particular, server equipment 18 may be configured to form any suitable number of compute devices for network management server 20 (collectively referred to herein as computing circuitry or processing circuitry 22) and may be configured to form any suitable number of storage devices for network management server 20 (collectively referred to herein as storage circuitry 24).

In particular, server equipment 18 may include server hardware such as blade servers, rack servers, and/or tower servers. Configurations in which server equipment 18 includes rack servers mounted to racks of a server chassis or enclosure are sometimes described herein as an illustrative example. Portions (e.g., all) of processing circuitry 22 and/or storage circuitry 24 may be provided as part of the server hardware (e.g., as part of the rack servers).

Processing circuitry 22 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures. Storage circuitry 24 may include one or more data storage devices based on non-volatile memory (e.g., flash memory or other electrically-programmable read-only memory configured to form a solid-state drive), volatile memory (e.g., static or dynamic random-access memory), hard disk drive storage, solid-state storage, and/or other storage circuitry.

More specifically, storage circuitry 24 may include one or more non-transitory (tangible) computer-readable storage media that stores the operating system software and/or any other software code, sometimes referred to as program instructions, software, data, instructions, or code. Processing circuitry 22 may run (e.g., execute) an operating system and/or other software/firmware that is stored on storage circuitry 24 to perform desired operations of network management server 20. In such a manner, server equipment 18 may implement one or more services, one or more software servers, and/or other software features to collectively perform the functions of network management server 20. As described herein, network management server 20 may refer to the underlying server (hardware) equipment and/or the server software (e.g., services, applications, etc.) executed thereon to perform the operations of server 20.

Server 20 may be coupled to a cloud network containing one or more network devices 10 (e.g., that form part of network 8). The cloud network may forward traffic to and from different pieces (e.g., compute, storage, management devices) of server equipment 18 that collectively implement server 20 and may forward traffic between server equipment 18 and other devices in network 8 (e.g., network devices 10 and host devices 12). As desired, server 20 may be implemented on public cloud infrastructure (e.g., the cloud network is a public cloud network) or may be implemented on private cloud infrastructure (e.g., the cloud network is a private cloud network or an on-premises network).

In configurations described herein as an illustrative example, server equipment 18 implementing server 20 may communicate to one or more network devices 10 via one or more network paths 16. In particular, network management server 20 may convey management information such as device configuration data to network devices 10 over path(s) 16 to manage the operation of network 8 (e.g., the configuration of at least some of the network devices 10 therein). Network paths 16 may be formed from one or more wired technologies or standards such as Ethernet and/or one or more wireless technologies or standards.

Administrator device(s) such as device 30 may provide user (e.g., network administrator) input to server 20 via one or more network paths 28 and may receive information for user output from server 20 via one or more network paths 28. Configurations in which administrator device 30 communicates with management server 20 to supply server 20 with input tag queries and/or manage tags of devices 10 are sometimes described herein as an illustrative example. If desired, server 20 may receive input from and/or supply output to other devices (e.g., directly via input-output device(s) of server 20).

The networking system in FIG. 1 may span any suitable scope dependent upon the implementations of the different devices and equipment therein. Accordingly, network paths 14, 16, and 28 may be implemented according to the scope of the networking system. Configurations in which one or more of network paths 28 include the Internet are sometimes described herein as an illustrative example. If desired, path(s) 28 may use Hypertext Transfer Protocol Secure (HTTPS) or other secure protocols for establishing and communicating using the corresponding paths between administrator device 30 and server 20.

In some instances, administrator device 30 may be an end host device 12 of network 8 and network path 28 may be formed by a combination of network paths 14 and 16. Similarly, in some instances, management server 20 (e.g., server equipment 18) may be implemented on server equipment forming host device 12. The separately shown devices and/or equipment depicted in FIG. 1 is illustrative of the different functions of the different devices and/or equipment within the networking system. These elements of the networking system may be implemented in other suitable arrangements, if desired.

Configurations in which network management functions described in connection with server 20 are executed on server equipment (e.g., cloud infrastructure) are sometimes described herein as an illustrative example. If desired, any of the network management functions of server 20 may be implemented locally (e.g., on administrator device 30, on one or more network controller devices, in distributed manner on one or more network devices 10, etc.) instead of as a cloud application (e.g., implemented on server equipment), or may be implemented in other desired manners. In general, a network management system may be described and referenced herein to contain any combination of server 20, administrator devices 30, one or more network devices 10, one or more network controller devices, and/or other devices or equipment configured to perform network management functions such as tag query processing operations, device tagging operations, network device configuration operations based on device tagging, etc.

Figure 2:
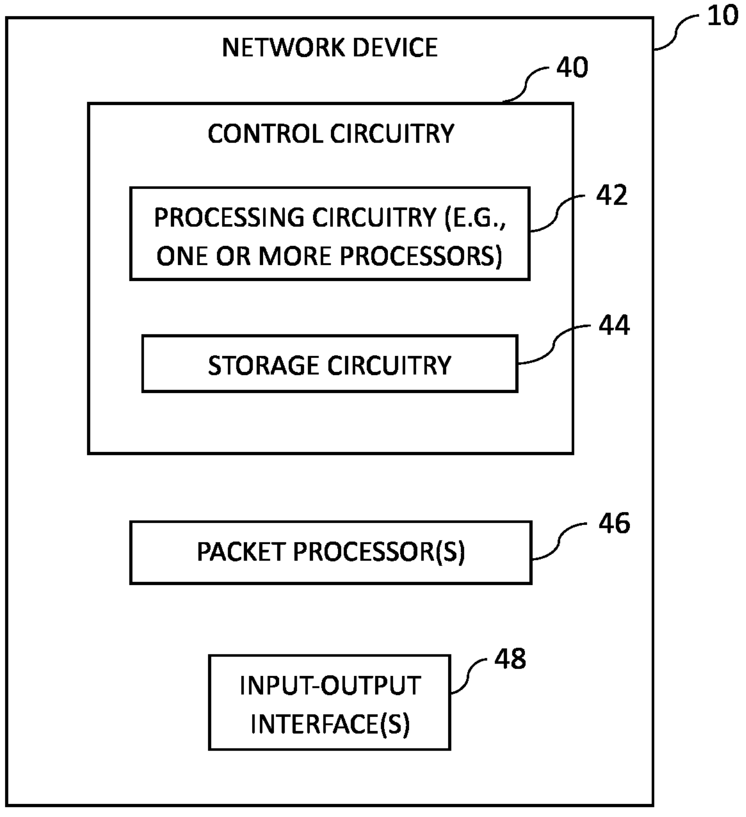
FIG. 2 is a diagram of an illustrative network device in accordance with some embodiments.

FIG. 2 is a diagram of an illustrative network device 10 that may implement one or more of network devices 10 in FIG. 1. As shown in FIG. 2, network device 10 may include control circuitry 40 having processing circuitry 42 and storage circuitry 44, one or more packet processors 46, and input-output interfaces 48 (e.g., ports). In one illustrative arrangement, network device 10 may be or form part of a modular network device system (e.g., a modular switch system having removably coupled modules usable to flexibly expand characteristics and capabilities of the modular switch system such as to increase ports, provide specialized functionalities, etc.). In another illustrative arrangement, network device 10 may be a fixed-configuration network device (e.g., a fixed-configuration switch having a fixed number of ports and/or a fixed hardware configuration).

Processing circuitry 42 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 42 may run (e.g., execute) a network device operating system and/or other software/firmware that is stored on storage circuitry 44. Storage circuitry 44 may include non-transitory (tangible) computer-readable storage media that stores the operating system software and/or any other software code, sometimes referred to as program instructions, software, data, instructions, or code. As an example, various control plane functions performed by network device 10 may be stored as (software) instructions on the non-transitory computer-readable storage media (e.g., in portion(s) of storage circuitry 44 in network device 10). The corresponding processing circuitry (e.g., one or more processors of processing circuitry 42 in network device 10) may process or execute the respective instructions to perform the corresponding control plane functions. Storage circuitry 44 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 10), and/or other storage circuitry. Processing circuitry 42 and storage circuitry 44 as described above may sometimes be referred to collectively as control circuitry 40 (e.g., implementing a control plane of network device 10).

As just a few examples, processing circuitry 42 may execute network device control plane software such as operating system software, routing policy management software, routing protocol agents or processes, routing information base agents, and other control software, may be used to support the operation of protocol clients and/or servers (e.g., to form some or all of a communications protocol stack such as the TCP/IP stack), may be used to support the operation of packet processor(s) 46, may store packet forwarding information, may execute packet processing software, and/or may execute other software instructions that control the functions of network device 10 and the other components therein.

Packet processor(s) 46 may be used to implement a data plane or forwarding plane of network device 10. Packet processor(s) 46 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 46 may receive incoming network traffic via input-output interfaces 48, parse and analyze the received network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on a portion of storage circuitry 44 and/or other storage circuitry integrated as part of or separate from packet processor(s) 46.

Input-output interfaces 48 may include different types of communication interfaces such as Ethernet interfaces, optical interfaces, a Bluetooth interface, a Wi-Fi interface, and/or other networking interfaces for connecting network device 10 to the Internet, a local area network, a wide area network, a mobile network, and generally other network device(s), peripheral devices, and other computing equipment (e.g., host equipment such as server equipment, administrator devices, end host devices, etc.). As an example, input-output interfaces 48 may be formed using and therefore include physical ports (e.g., Ethernet ports, optical fiber ports, etc.) to which corresponding mating connectors of external components can be physically coupled and electrically connected. Ports may have different form-factors to accommodate different cables, different modules, different devices, or generally different external equipment.

A network such as network 8 (FIG. 1) may include numerous network devices 10 of different types or functions (e.g., from different vendors, having different functional properties such as being switches, routers, gateways, firewalls, etc.), at different physical locations (e.g., at different geographical sites, on different floors of a building, for different departments in a company), at different network locations (e.g., at different network layers such as in the leaf or access layer, in the spine layer, in the provider edge layer, in the customer edge layer, etc., within different domains, handling traffic for different segments and/or different virtual local area networks (VLANs), configured handle different network flows, etc.) within network 8, and/or generally implemented in different contexts and used to serve different functions within the network. Each of these network devices 10 and other devices in network 8 may be tagged within informational tags that convey the relevant networking information (e.g., device vendor or manufacturer information, device function information, device physical location information, device network location information, etc.) for the tagged network device 10.

Configurations in which a network management system such as network management server 20 tags network devices 10 with informational tags (e.g., associates one or more tags with each network device 10), stores the association between network device 10 and informational tags, handle tag-based queries or requests (e.g., provide output for application requests, user queries, etc.) are sometimes referred to herein as an illustrative example. If desired, network devices 10 may locally perform one or more of these functions (e.g., store their informational tags) and/or other devices within network 8 may locally perform one or more of these functions (e.g., controller devices managing different subsets of network devices 10 performing one or more of these functions of the managed subset of network devices 10), instead of or in addition to management server 20 performing these functions.

Figure 3:
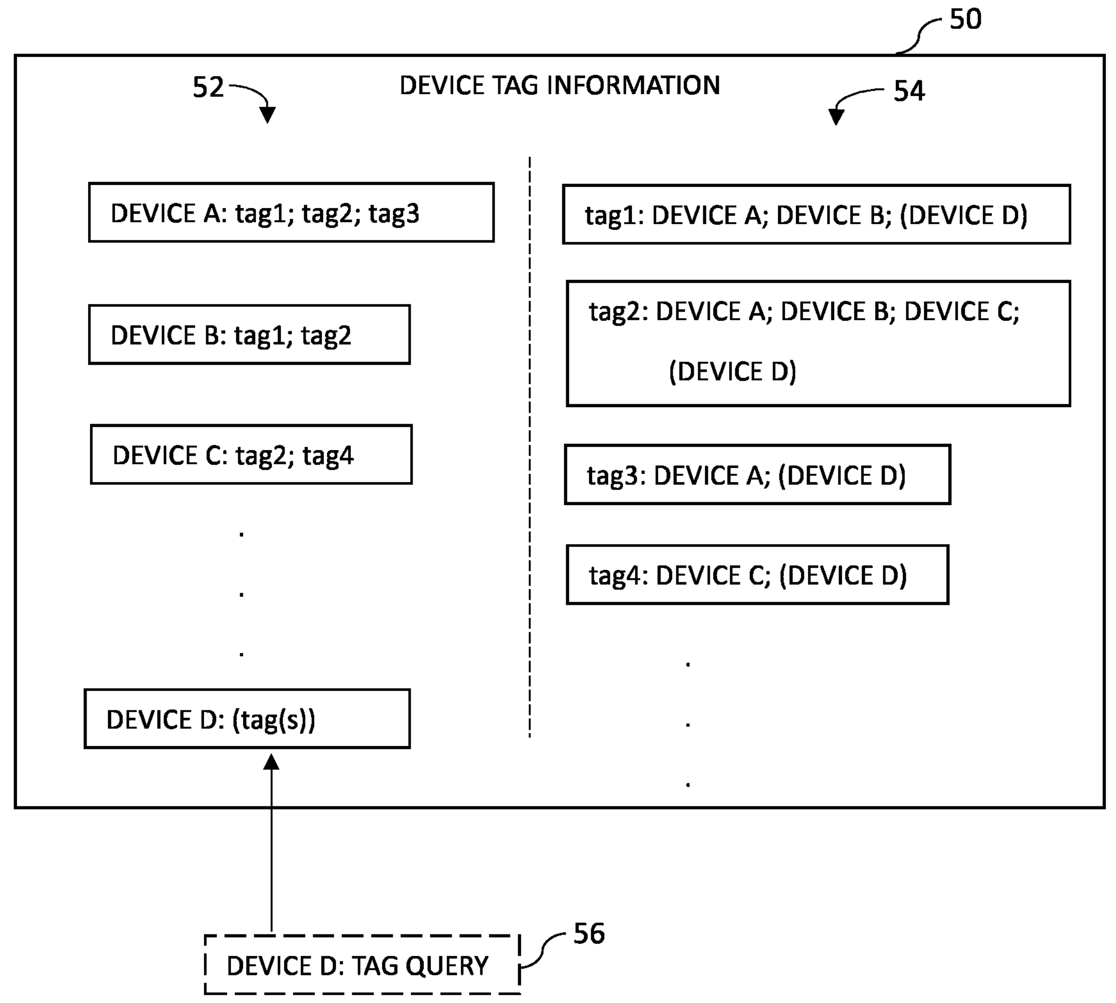
FIG. 3 is a diagram of illustrative device tag information for a set of devices in accordance with some embodiments.

FIG. 3 is a diagram of illustrative device tag information 50 that contains associations between devices (e.g., network devices 10) and tags (e.g., informational tags containing device functional information, device physical location information, and/or device network location information). Network management server 20 may store device tag information 50 (e.g., at storage circuitry 24). Network management server 20 may perform the device-tag association locally to generate device tag information 50 and/or may receive device tag information 50 generated locally at one or more external devices (e.g., locally at one or more network devices 10, locally at one or more controller devices that controls subsets of network devices 10, etc.). Device tag information 50 may be stored as device-to-tag associations 52, as tag-to-device associations 54, and/or generally any suitable structure or information indicative of associations between devices and tags.

In the example of FIG. 3, device tag information 50 is shown for three illustrative devices A, B, and C (e.g., three instances of network devices 10 in FIGS. 1 and 2). As conveyed by device-to-tag associations 52 (sometimes referred to as a device-centric representation), device A may be associated (e.g., tagged) with informational tags 1, 2, and 3, device B may be associated (e.g., tagged) with informational tags 1 and 2, and device C may be associated (e.g., tagged) with informational tags 2 and 4. In a different representation of the same information, tag-to-device associations 52 (sometimes referred to as a tag-centric representation) may convey that tag tag1 has been associated with devices A and B, tag tag2 has been associated with devices A, B, and C, tag tag3 has been associated with device A, and tag tag4 has been associated with device C.

As described above, these informational tags (sometimes referred to herein simply as tags or labels) such as tags 1, 2, 3, and 4 in FIG. 3 may be used to convey contextual information for devices such as device physical location information, device network location information, device functional information, etc. Some illustrative tags are described below as just a few non-limiting examples.

A first set of tags may be indicative of a geographical (physical) location of the device. For example, a device tagged with a first tag in the set is indicative of the tagged device being in a first geographical region, country, city, building, floor, or datacenter site, and a device tagged with second tag in the set is indicative of the tagged device being in a second geographical region, country, city, building, floor, or datacenter site.

A second set of tags may be indicative of a networking context (location) of the device. For example, a device tagged with a first tag in the set is indicative of the tagged device being in a core or spine device layer of the network, and a device tagged with second tag in the set is indicative of the tagged device being in an edge, leaf, access, or top-of-rack device layer of the network.

A third set of tags may be indicative of another networking context of the device. For example, a device tagged with a first tag in the set is indicative of the tagged device being configured to handle network traffic for a first set of host devices such as those in the same VLAN, in the same segment, in the same computing cluster, in the same container, and/or for the same application or service and a device tagged with a second tag in the set is indicative of the tagged device being configured to handle network traffic for a second set of host devices such as those in the same VLAN, in the same segment, in the same computing cluster, in the same container, and/or for the same application or service.

A fourth set of tags may be indicative of yet another networking context of the device. For example, a device tagged with a first tag in the set is indicative of the tagged device being configured to handle network traffic for a first network flow and a device tagged with a second tag in the set is indicative of the tagged device being configured to handle network traffic for a second network flow.

A fifth set of tags may be indicative of device type or function of the device. For example, a device tagged with a first tag in the set is indicative of the tagged device being from a first vendor or manufacturer or having a first vendor-specific identifier and a device tagged with a second tag in the set is indicative of the tagged device being from a second vendor or manufacturer or having a second vendor-specific identifier.

A sixth set of tags may be indicative of another device type or function of the device. For example, a device tagged with a first tag in the set is indicative of the tagged device being a first one of a switch, router, gateway, wireless access point, firewall, or another type of network device, and a device tagged with a second tag in the set is indicative of the tagged device being a second one of a switch, router, gateway, wireless access point, firewall, or another type of network device.

These examples are merely illustrative. If desired, any suitable tag may be used (e.g., customized by a user or network administrator) to convey desired information about one or more network devices. Some tags (e.g., tags within the first set of tags associated with geographical location) may be mutually exclusive, while other tags (e.g., a tag selected from each of the one or more sets of tags described above) may be used collectively to provide detailed contextual information about the tagged device.

Based on the maintained device tag information 50, network management server 20 may process received tag queries to generate an appropriate output. As described herein as an illustrative example, a tag query may be a Boolean expression containing tags as the Boolean variables (e.g., each tag can take on two possible values: true (T) indicating the presence of the tag or false (F) indicating the absence of the tag) and Boolean operators (e.g., operators AND, OR, NOT, XOR, etc.) operating on the tags. While configurations in which the tag queries are represented by Boolean expressions are described herein as an illustrative example, this is merely illustrative. If desired, the management system (e.g., server 20) may receive tag queries in other forms (e.g., as natural language queries from users, tag queries in forms defined by application programming interfaces, etc.) and may parse these tag queries to arrive at the Boolean expressions described herein.

In one illustrative application of tag queries, network management server 20 may receive a tag query and process the tag query to identify a number of devices (if any) that satisfy the tag query. In particular, each device (e.g., each device 10 in network 8) may have a particular set of tags (sometimes referred to as the tag state of the device). Management server 20 may provide output indicating tagged devices that satisfy the received tag query. Using FIG. 3 as an example, network management server 20 may receive a tag query that indicates "tag1 AND tag2" (i.e., devices that are associated or tagged with both tags tag1 and tag2) and appropriately identify devices A and B as the tagged devices that satisfy the received tag query. Using FIG. 3 as another example, network management server 20 may receive a tag query that indicates "tag3 OR tag4" (i.e., devices that are associated or tagged with at least one of tags tag3 or tag4) and appropriately identify devices A and C as the tagged devices that satisfy the received tag query.

In addition to or instead of an application of tag queries to identify query-satisfying devices already tagged with the tags, management server 20 may also identify a set of tags (a device tag state) to associate with a device to satisfy a received tag query. In fact, it may be desirable to do so to simplify that device tagging process for a user or network administrator.

Still referring to the example of FIG. 3, management server 20 may receive input 56 indicating one or more devices such as device D (e.g., another instance of device 10 in FIGS. 1 and 2) and a tag query based on which the tag state of device D should be updated to satisfy the tag query in input 56. Responsive to input 56, management server 20 may process the tag query to identify one or more the tag states of device D that would satisfy the tag query and update stored device tag information 50 to include device D and its association with the tag(s) that satisfy the tag query indicated in input 56. In particular, device-to-tag associations 52 may be updated to include device D may be associated with informational one or more tags (that satisfy the tag query indicated in input 56) and/or tag-to-device associations 54 may be updated to include device D in any tags with which device D is associated (based on the tag query indicated in input 56).

Due to the presence of complex input tag queries, it may be difficult to guarantee general processing of all input tag queries. To facilitate processing of tag queries (whether to obtain query-satisfying devices or to update device-tag associations), management server 20 may standardize (e.g., simplify) the received tag queries, thereby enabling tag query processing in a reasonable and/or scalable manner. In particular, by ensuring the even complex input tag queries can be processed, management server 20 may enable efficient (e.g., minimal) device-tag associations based on input tag queries. Configurations in which an input tag query is standardized and used to identify tag(s) with which network devices should be tagged (e.g., identify device tag state(s) that satisfy that tag query) are sometimes described herein as an illustrative example. If desired, the input tag query may be simplified (or generally standardized) and processed as part of other processes (e.g., obtain query-satisfying devices, provide other output for other applications via an application programming interface, etc.). In general, the standardization (e.g., simplification) and processing of tag queries as described herein may be applicable to tag queries or generally any Boolean expression with tags for any suitable purposes.

FIGS. 4-5 show two illustrative tag queries and their processing to illustrate the standardization process and how one or more illustrative device tag states (e.g., a set of tags to associate with a device) may be obtained based on the received tag queries.

In particular, to standardize (e.g., in some instances, simplify) a tag query, management server 20 may process the tag query to generate a truth table corresponding to the tag query. To generate the truth table, management server 20 may compute, for each possible combination of input values to the tag query, the corresponding tag query output to that combination of input values. The truth table may be populated with all combinations of input values and their respective output values.

Figure 4A:
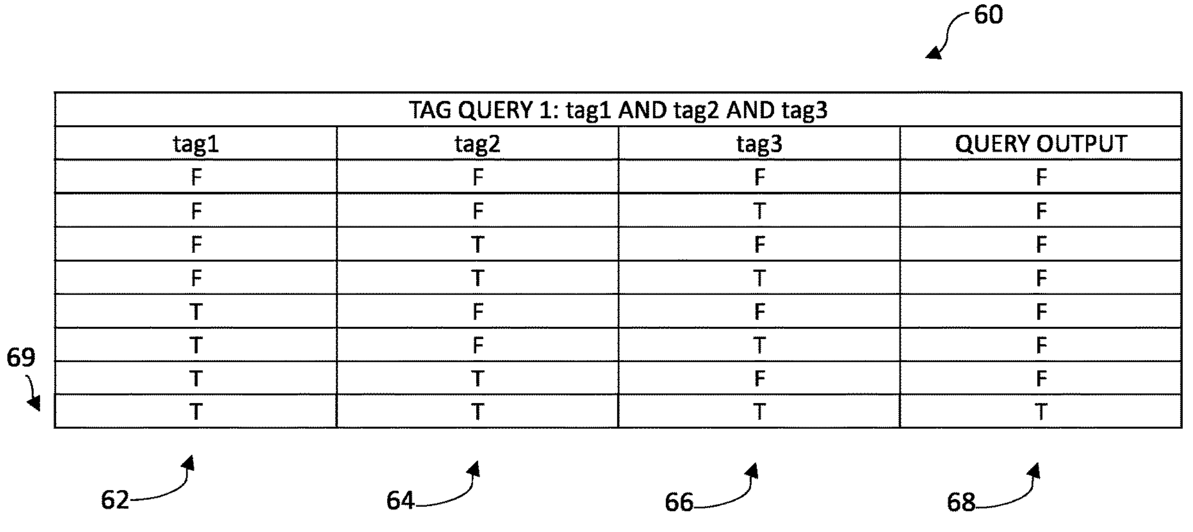
FIG. 4A is a table of inputs and outputs for a first illustrative tag query in accordance with some embodiments.
Figure 4B:
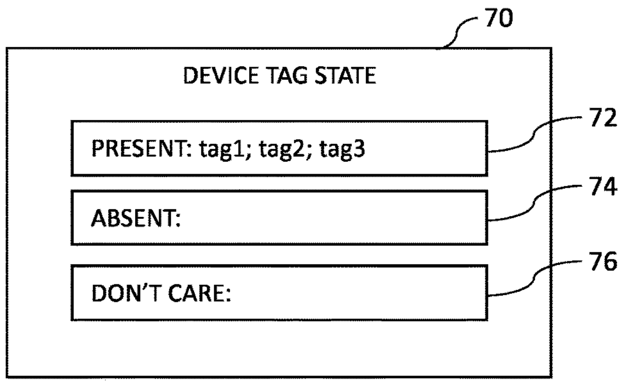
FIG. 4B is a diagram of an illustrative device tag state based on the tag query of FIG. 4A in accordance with some embodiments.

In the example of FIGS. 4A and 4B, the illustrative tag query may be or may be indicative of the Boolean expression "tag1 AND tag2 AND tag3." FIG. 4A shows a truth table 60 generated for this illustrative tag query. In particular, column 62 shows input values for tag tag1 (as a Boolean variable), column 64 shows input values for tag tag2 (as a Boolean variable), column 66 shows input values for tag tag3 (as a Boolean variable), column 68 shows query outputs (Boolean outputs) corresponding to each combination of input values for tags tag1, tag2, and tag 3. As described herein, a value of "F" (e.g., a False value or a binary "0" value) may be indicative of an input tag being absent or a query output not satisfying the tag query, whereas a value of "T" (e.g., a True value or a binary "1" value) may be indicative of an input tag being present or a query output satisfying the tag query.

Based on truth table 60, management server 20 may identify the combination of input values for tags tag1, tag2, and tag3 that satisfy the tag query (e.g., generate a "T" value as the query output in column 68). In the example of FIG. 4A, row 69 is the only row that provides a set of tags and their states (e.g., a device tag state) satisfying the tag query.

Accordingly, management server 20 may determine device tag state 70 in FIG. 4B for satisfying the tag query based on row 69 of truth table 60 in FIG. 4A. In particular, device tag state 70 may defined by one or more present tags 72 that should be present to satisfy the tag query, one or more absent tags 74 that should be absence to satisfy the query, and one or more irrelevant tags 76 that are don't care tag(s) or tag(s) whose absence or presence are irrelevant to satisfying the tag query.

Based on the values of tags tag1, tag2, and tag3 for row 69 all being True (T) to generate the query output having the True (T) value, management server 20 may identify tags tag1, tag2, and tag3 all as present tags 72 that should be present to satisfy the tag query. In other words, none of tags tag1, tag2, and tag3 are absent tags 74 and none of tags tag1, tag2, and tag3 are irrelevant tags 76.

In one illustrative scenario in which input 56 (FIG. 3) indicates device tagging of device D based on the tag query described in connection with FIGS. 4A and 4B, management server 20 may perform the operations described in connection with FIGS. 4A and 4B and determine that device D should be tagged based on device tag state 70. In other words, management server 20 (and/or other portions of the management system) may update device tag information 50 (FIG. 3) for device D such that device D is associated with tags tag1, tag2, and tag3 (e.g., tags 72 that should be present to satisfy the tag query). As described in connection with FIG. 3, this can be achieved by updating associations 52 and/or associations 54. In scenarios in which the device tag state includes absent tags 74 (FIG. 4B), management server 20 may update device tag information 50 to explicitly exclude any absent tags 74 during the tagging process (e.g., dissociate absent tags 74 from device D).

While the illustrative tag query described in FIGS. 4A and 4B leads to a single device tag state that satisfies the tag query, this may not always be the case, especially with more complex tag queries (e.g., queries with an OR Boolean operator). For example, in connection with FIGS. 5A-5D, the illustrative tag query may be or may be indicative of the Boolean expression "(tag1 OR tag2) AND tag3." FIG. 5A shows a truth table 80 generated for this illustrative tag query.

In particular, column 82 shows input values for tag tag1 (as a Boolean variable), column 84 shows input values for tag tag2 (as a Boolean variable), column 86 shows input values for tag tag3 (as a Boolean variable), column 88 shows query outputs (Boolean outputs) corresponding to each combination of input values for tags tag1, tag2, and tag 3.

Based on truth table 80, management server 20 may identify the combination of input values for tags tag1, tag2, and tag3 that satisfy the tag query (e.g., generate a "T" value as the query output in column 68). In the example of FIG. 5A, rows 85, 87, and 89 (sometimes referred to as entries 85, 87, and 89 of the truth table) each are a row (entry) that identifies a set of tags and their states (e.g., a device tag state) satisfying the tag query.

Figure 5A:
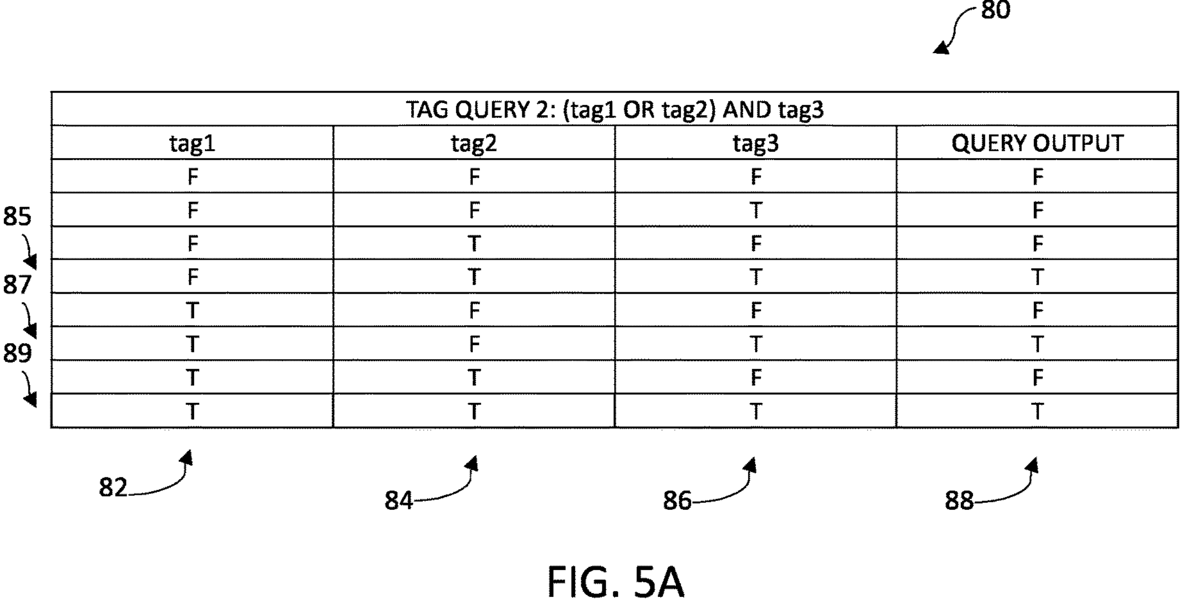
FIG. 5A is a table of inputs and outputs for a second illustrative tag query in accordance with some embodiments.
Figure 5B:
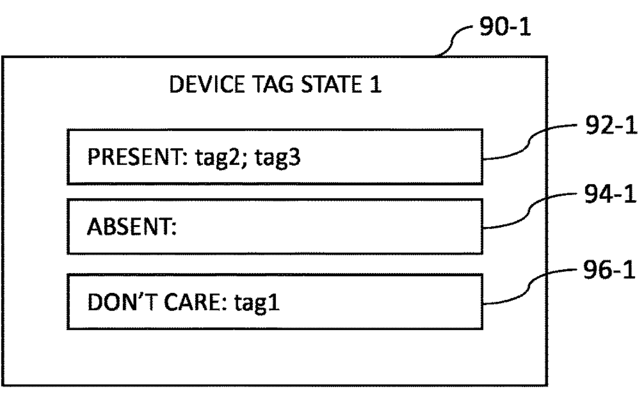
FIG. 5B-5D are diagrams of illustrative device tag states based on the tag query of FIG. 5A in accordance with some embodiments.

Based on row 85 of truth table 80 in FIG. 5A, management server 20 may obtain device tag state 90-1 in FIG. 5B for satisfying the tag query. In particular, device tag state 90-1 may defined by one or more present tags 92-1 that should be present to satisfy the tag query, one or more absent tags 94-1 that should be absence to satisfy the query, and one or more irrelevant tags 96-1 that are don't care tag(s) or tag(s) whose absence or presence are irrelevant to satisfying the tag query.

Based on the values of tags tag2 and tag3 for row 85 being True (T) to generate the query output having the True (T) value, management server 20 may identify tags tag2 and tag3 as present tags 92-1 that should be present to satisfy the tag query. Based on the value of tag tag1 for row 85 being False (F), management server 20 may determine whether or not tag tag1 is an absent tag 94-1 or an irrelevant tag 96-1. Accordingly, based on comparing the tag query outputs of rows 85 and 89, which both keep the input values of tags tag2 and tag3 as True but have different input values for tag tag1, management server 20 may determine that regardless of the input value of tag tag1 being false (e.g., as in row 85) or true (e.g., as in row 89), the tag query output remains True (e.g., for both rows 85 and 89). As such, management server 20 may identify tag tag1 as an irrelevant tag 96-1 (as shown in the example of FIG. 5B). In another scenario in which changing an undecided tag's input value from False to True results in the tag query output changing from True to False, the undecided tag may be identified as an absent tag (instead of an irrelevant tag).

Figure 5C:
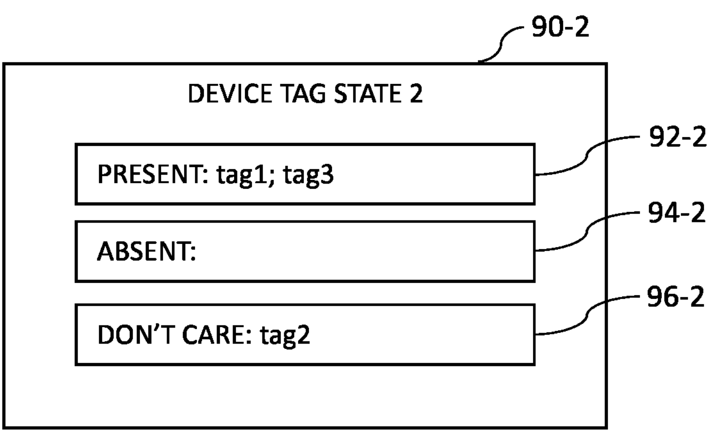

Based on row 87 of truth table 80 in FIG. 5A, management server 20 may obtain device tag state 90-2 in FIG. 5C for satisfying the tag query. In particular, device tag state 90-2 may defined by one or more present tags 92-2 that should be present to satisfy the tag query, one or more absent tags 94-2 that should be absence to satisfy the query, and one or more irrelevant tags 96-2 that are don't care tag(s) or tag(s) whose absence or presence are irrelevant to satisfying the tag query.

Based on the values of tags tag1 and tag3 for row 87 being True (T) to generate the query output having the True (T) value, management server 20 may identify tags tag 1 and tag3 as present tags 92-2 that should be present to satisfy the tag query. Based on the value of tag tag2 for row 87 being False (F), management server 20 may determine whether or not tag tag2 is an absent tag 94-2 or an irrelevant tag 96-2. Accordingly, based on comparing the tag query outputs of rows 85 and 89, which both keep the input values of tags tag1 and tag3 as True but have different input values for tag tag2, management server 20 may determine that regardless of the input value of tag tag2 being false (e.g., as in row 87) or true (e.g., as in row 89), the tag query output remains True (e.g., for both rows 87 and 89). As such, management server 20 may identify tag tag2 as an irrelevant tag 96-2 (as shown in the example of FIG. 5C).

Figure 5D:
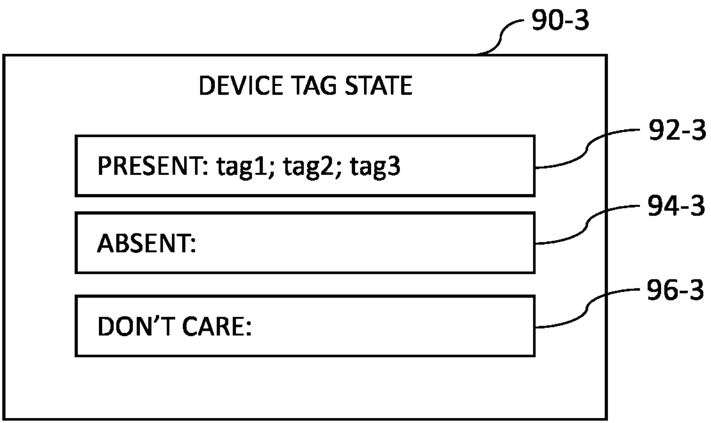

Based on row 89 of truth table 80 in FIG. 5A, management server 20 may obtain device tag state 90-3 in FIG. 5D for satisfying the tag query. In particular, device tag state 90-3 may defined by one or more present tags 92-3 that should be present to satisfy the tag query, one or more absent tags 94-3 that should be absence to satisfy the query, and one or more irrelevant tags 96-3 that are don't care tag(s) or tag(s) whose absence or presence are irrelevant to satisfying the tag query.

Based on the values of tags tag1, tag2, and tag3 for row 89 being True (T) to generate the query output having the True (T) value, management server 20 may identify tags tag1, tag2, and tag3 as present tags 92-3 that should be present to satisfy the tag query. In other words, none of tags tag1, tag2, and tag3 are absent tags 94-3 and none of tags tag1, tag2, and tag3 are irrelevant tags 96-3.

In one illustrative scenario in which input 56 (FIG. 3) indicates device tagging of device D based on the tag query described in connection with FIGS. 5A-5D, management server 20 may perform the operations described in connection with FIGS. 5A-5D and determine that device D should be tagged based on one of device tag states 90-1 (FIG. 5B), 90-2 (FIG. 5C), or 90-3 (FIG. 5D). In particular, management server 20 may select one of device tag states 90-1, 90-2, or 90-3 for tagging device D based on any suitable criteria (e.g., may prompt user input and select the one device tag state based on user input, may select the one device tag state with fewer or fewest present tags such as one of device tag states 90-1 and 90-2, may select the one device tag state with no irrelevant tags such as device tag state 90-3, may select the one device tag state randomly, and/or may select the one device tag state based on another criterion).

In one illustrative example, management server 20 (and/or other portions of the management system) may select device tag state 90-1 out of device tag states 90-1, 90-2, and 90-3 and may update device tag information 50 (FIG. 3) for device D such that device D is associated with tags tag2 and tag3 (e.g., tags 92-1 that should be present to satisfy the tag query). As described in connection with FIG. 3, this can be achieved by updating associations 52 and/or associations 54. Because device tag state 90-1 includes tag tag1 as an irrelevant tag 96-1 (FIG. 5B), management server 20 may update device tag information 50 to optionally include or exclude (e.g., associates or disassociate) tag tag1 as desired (e.g., leaving device D tagged with tag tag1 if device D was previously already associated with tag tag1 and leaving device D not tagged with tag tag1 if device D was previously not associated with tag tag1).

The two illustrative tag queries described in connection with FIGS. 4 and 5 are merely illustrative of some of the types of tag queries may be processed. If desired, other tag queries may be processed in a similar manner to obtain one or more device tag states that satisfy that tag query. By classifying the tags in the tag query into three types of tags (e.g., present tags, absent tags, and irrelevant tags), a canonical form of the tag query represented by the classified tags may be obtained regardless of the length and/or complexity of the tag query. Accordingly, tag queries may be processed in an efficient and scalable manner. In scenarios in which tag queries contain redundancies, obtaining the canonical (standardized) form of that tag query may also help simplify the received tag query and remove any redundancies.

In some configurations described herein as an illustrative example, tags and tag queries may be used to facilitate management of device configurations. As an illustrative example, devices associated with a first tag may be configured by a management system in a first manner (e.g., receive first configuration data from the management system for configuring the devices), while devices associated with a second tag may be configured in a second manner (e.g., receive second configuration data for configuring the devices). Configurations in which the configuration data conveyed from the management system to the device are in the form of configlets are sometimes described herein as an illustrative example. If desired, the device configuration data may be in any other suitable forms.

Figure 6:
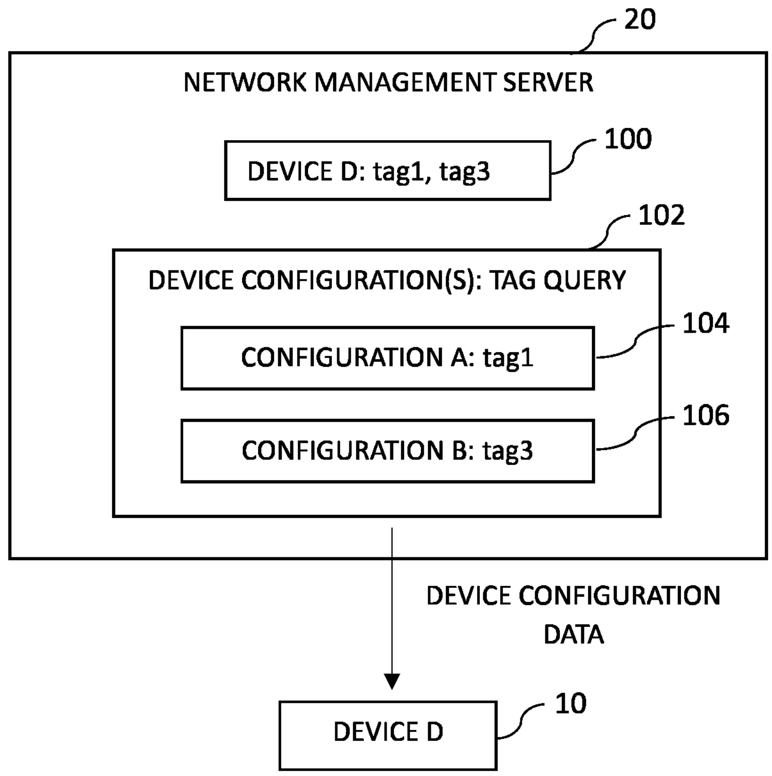
FIG. 6 is a diagram of illustrative device configurations being provided based on informational tags associated with a network device in accordance with some embodiments.

FIG. 6 is a diagram of illustrative device configurations being associated with different sets of tags. As shown in FIG. 6, a network management system such as network management server 20 may store a device-tag association 100 for device D (e.g. as part of device tag information 50 in FIG. 3). Network management server 20 may store or otherwise have access to one or more device configurations (e.g., a library of configlets) that each identify corresponding tag(s) such that devices with the matching tag(s) should be applied with the corresponding device.

In the example of FIG. 6, device D may be labeled with tags tag1 and tag3 (e.g., based on the tag query described in connection with FIG. 5A and device tag stage 90-2 selectively applied to device D), as shown by association 100. Accordingly, devices that satisfy the tag query described in connection with FIG. 5A may be applied with one or more device configurations 102 (e.g., one or more configlets). In the example of FIG. 6, configurations 102 may include a first configuration 104 for devices with tag tag1 and a second configuration 106 for devices with tag tag3.

Separate configurations 104 and 106 being shown for configuration(s) 102 is merely illustrative. If desired, device configuration(s) 102 may be applied to all devices that satisfy the specified tag query (e.g., not only devices that satisfy the tag query by being tagged with tags tag1 and tag 3 but also devices that satisfy the tag query by having device tag states 90-1 in FIG. 5B and 90-3 in FIG. 5D).

Based on the tags of device D satisfying the tag query specified by device configuration(s) 102, network management server 20 may convey configuration data such as data for configurations 104 and 106 (e.g., configlets or other types of configuration data that affect the routing and/or forwarding of network traffic, policy and/or rules enforced at the device, the functionalities of the device, etc.) at device D (e.g., an instance of network device 10 in FIGS. 1 and 2).

Figure 7:
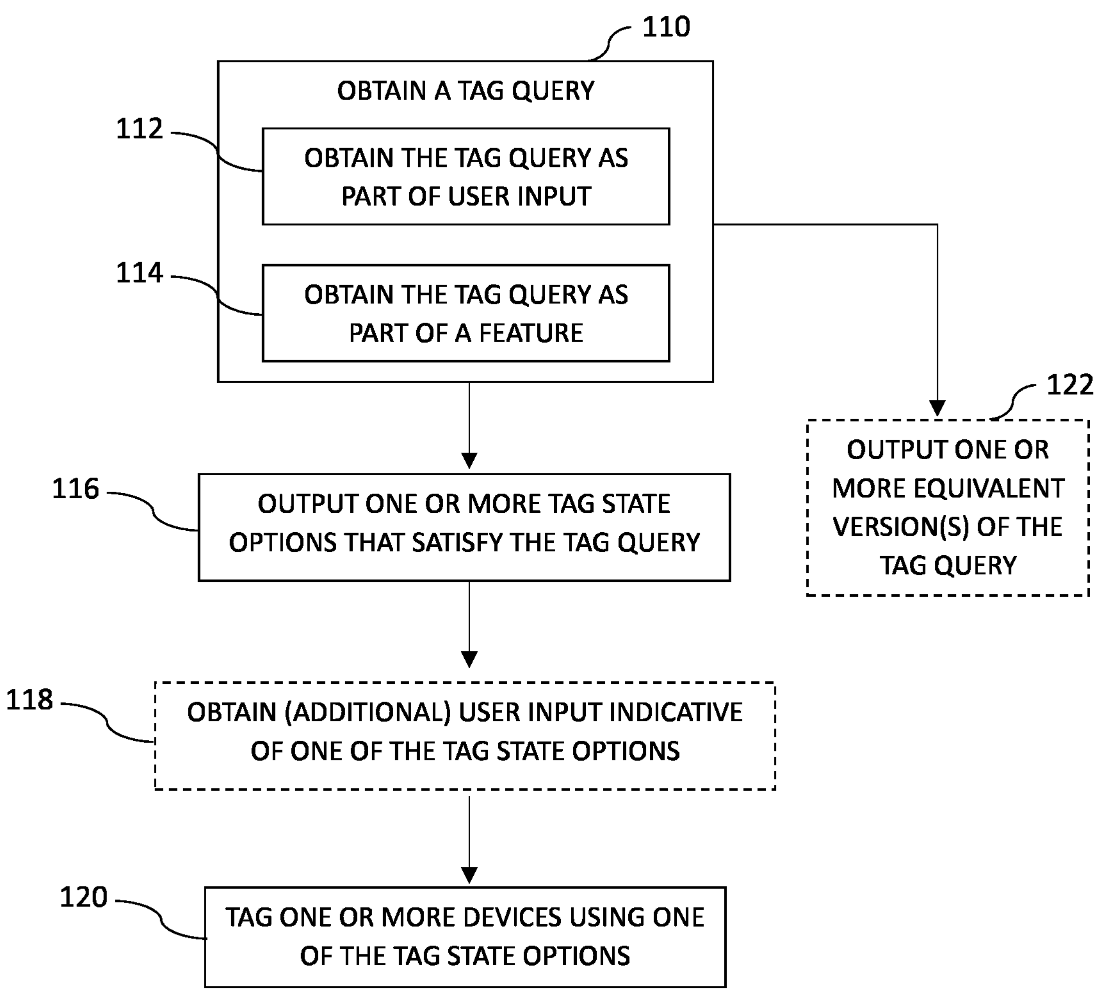
FIG. 7 is a flowchart of illustrative operations for device tagging based on a tag query in accordance with some embodiments.

FIG. 7 is a flowchart of illustrative operations for operating a network (device) management system such as management server 20 to perform device tagging based on a tag query. These operations may be performed at processing circuitry 22 in server 20. The illustrative operations described in connection with FIG. 7 performed by one or more processors (e.g., processing circuitry 22) in server 20 may be performed by executing software instructions stored on corresponding storage circuitry 24 (e.g., one or more non-transitory computer-readable storage media). If desired, one or more (e.g., all) operations described in connection with FIG. 7 may be performed by other hardware components in other devices or equipment in an analogous manner (e.g., performed by processing circuitry on one or more controller devices, processing circuitry on network devices 10, processing circuitry on administrator device 30, and/or processing circuitry on other devices or equipment configured to form the network management system by executing software instructions stored on corresponding storage circuitry).

At block 110, one or more processors such as processing circuitry 22 of server 20 may obtain a tag query.

In one illustrative arrangement, the one or more processors may obtain the tag query as part of user input (at block 112). The user input may specify the tag query as part of a request to receive one or more devices that satisfy the tag query, may specify the tag query as part of a request to tag one or more devices (e.g., in the same request) with tags such that the one or more devices is configured to satisfy the tag query, may specify the tag query as part of another type of request. The one or more processors may receive the user input directly (e.g., locally via input-output devices at server 20 formed from the one or more processors) or indirectly (e.g., via an administrator device conveying the user input received locally or directly via a network path such as network path 28, etc.). In another illustrative arrangement, the one or more processors may obtain the tag query as part of a feature, e.g., as part of an application request from another application server, as part of a request from a service device or an external network controller device, etc. (at block 114). The one or more processors may obtain the tag query as part of the feature via a software interface such as an application programming interface.

At block 116, the one or more processors may output one or more tag state options that satisfy the obtained tag query based on processing the tag query. As an example, the one or more processors may output a single tag state (e.g., tag state 70 in FIG. 4B) as an (tag state) option to satisfy the tag query (e.g., the tag query of FIG. 4A). As another example, the one or more processors may output multiple tag states (e.g., tag states 90-1, 90-2, and 90-3 in FIGS. 5B-5D) as multiple (tag state) options each satisfying the tag query (e.g., the tag query of FIG. 4A). In some configurations described herein as an illustrative example, the operations described in connection with FIG. 8 may be used to obtain the one or more tag state options based on processing the tag query.

At block 118, the one or more processors may prompt for and obtain user input indicative of a given tag state option, if desired. In particular, in instances where multiple tag state options are possible to satisfy the same tag query, the one or more processors may prompt for user input to indicate one of the multiple tag state options. In instances where only a single tag state option is possible to satisfy the tag query, the one or more processors may prompt for user input to confirm that the single tag state option should be applied or used. If desired, the operation of block 118 may be omitted (e.g., after performing the operations of block 116, processing may proceed directly to block 118).

At block 120, the one or more processors may tag one or more devices (e.g., specified in the request described in connection with blocks 110, 112, and 114) using one of the tag state options. In particular, as part of the tagging process, the one or more processors may associate a device with one or more tags (e.g., present tags as described in connection with FIGS. 4B and 5B-5D) and dissociate the device from one or more tags (e.g., absent tags as described in connection with FIGS. 4B and 5B-5D). If desired, as part of the tagging process, may selectively associate or dissociate the device from one or more tags (e.g., irrelevant tags as described in connection with FIGS. 4B and 5B-5D).

While the operations at blocks 116, 118, and 120 may be used to perform device tagging, blocks 110, 112, and 114 may be performed in other applications (e.g., non-device tagging applications). In these other applications, processing may proceed from block 110 to block 122 (instead of or in addition to proceeding to blocks 116, 118, and 120).

At block 122, the one or more processors may output one or more equivalent version(s) of the obtained tag query. The equivalent version(s) of the obtained tag query may be of a standardized version (e.g., a canonical form) of the obtained tag query and/or a simplified version of the tag query. The one or more processors may provide the equivalent version(s) of the tag query to any request specified by other applications, services, features, etc., for further processing or storage. Configurations in which the conical form of the tag query for output is a sum-of-products form (as described in connection with block 134 in FIG. 8) or simply one or more (e.g., all) products in the sum-of-products form are sometimes described herein as an illustrative example.

Figure 8:
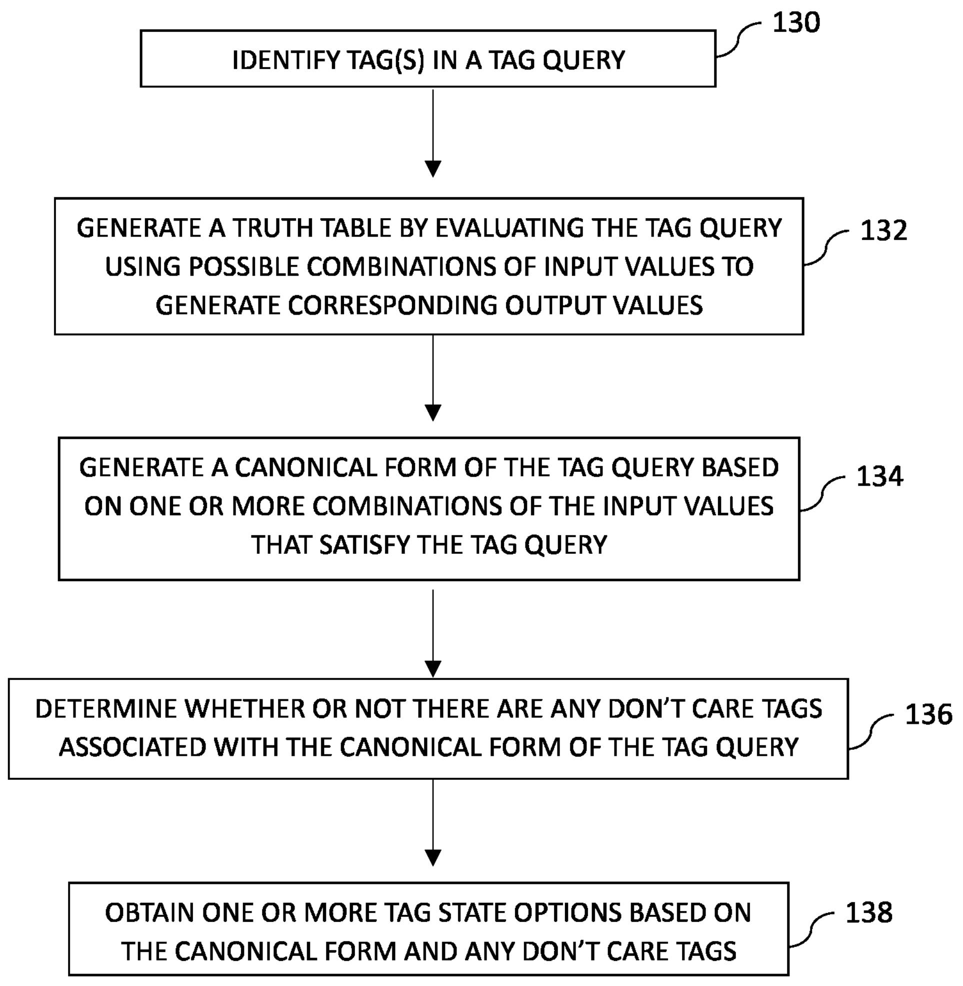
FIG. 8 is a flowchart of illustrative operations for processing a tag query in accordance with some embodiments.

FIG. 8 is a flowchart of illustrative operations for operating a network (device) management system such as management server 20 to process a tag query. These operations may be performed at processing circuitry 22 in server 20. The illustrative operations described in connection with FIG. 8 performed by one or more processors (e.g., processing circuitry 22) in server 20 may be performed by executing software instructions stored on corresponding storage circuitry 24 (e.g., one or more non-transitory computer-readable storage media). If desired, one or more (e.g., all) operations described in connection with FIG. 8 may be performed by other hardware components in other devices or equipment in an analogous manner (e.g., performed by processing circuitry on one or more controller devices, processing circuitry on network devices 10, processing circuitry on administrator device 30, and/or processing circuitry on other devices or equipment configured to form the network management system by executing software instructions stored on corresponding storage circuitry).

At block 130, one or more processors such as processing circuitry 22 of server 20 may identify one or more tag(s) in a tag query (e.g., the tag query obtained at block 110 in FIG. 7). In particular, the tag query may be indicative of a Boolean expression (e.g., as described in connection with FIGS. 4 and 5) with the tags as the input Boolean variables. By identifying the tag(s) in the tag query, the one or more processors may determine the tags for which tag states should be determined.

At block 132, the one or more processors may generate a truth table by evaluating the tag query using possible combinations of input values to generate corresponding output values. In particular, each tag in the tag query may take on an input value of either a first binary (Boolean) value (e.g., a True (T) value or a '1' value) or a second binary (Boolean) value (e.g., a False (F) value or a '0' value). As examples, there may be four possible combinations of input values (e.g., four rows of combinations of input values in a truth table) for a tag query containing two tags, there may be eight possible combinations of input values (e.g., eight rows of combinations of inputs values in a truth table such as truth table 60 in FIG. 4A or truth table 80 in FIG. 5A), etc. The one or more processors may evaluate the tag query using each of the possible combinations of input values to generate corresponding tag query output values to populate the truth table (e.g., as described in connection with FIGS. 4A and 5A).

While the generation of a truth 'table' is sometimes described herein, the generation and storage of the information indicative of entries (e.g., shown by rows) in the truth table may not necessarily be tabular in form. If desired, the one or more processors may generate the truth table by generating information or data in any suitable form insofar as the same types of data are generated. Truth tables 60 in FIG. 4A and 80 in FIG. 5A are merely illustrative of the types of content to be obtained, generated, and/or stored.

At block 134, the one or more processors may generate a canonical form (sometimes referred to herein as a standardized form) of the tag query based on one or more combinations of the input values that satisfy the tag query. As an example, the generated canonical form of the tag query may be a sum-of-products form of the tag query. In particular, the one or more processors may generate a sum-of-products form based on the generated truth table of the tag query.

Using truth table 80 in FIG. 5A as an illustrative example, each row where the tag query, (tag1 OR tag2) AND tag 3, is satisfied represents a different product. Accordingly the sum-of-products form of this tag query may be [(NOT tag1) AND tag2 AND tag3] OR [tag1 AND (NOT tag2) AND tag3] OR [tag1 AND tag2 AND tag3]. In particular, for this example, there may be three products, each of which indicating a different tag state that satisfies the tag query (respectively represented by FIGS. 5B-5D). These three products are summed (e.g., have the OR Boolean operator applied between them).

At block 136, the one or more processors may determine whether or not there are any don't care tags associated with the canonical form of the tag query. When a tag in the canonical form of the tag query is applied with the NOT Boolean operator, it is not necessarily indicative of the tag being required to be absent to satisfy the tag query. In some instances, the tag may be irrelevant to satisfying the tag query (e.g., may be a don't care tag or an irrelevant tag). In particular, the one or more processors may determine whether or not flipping (changing) the tag in question changes the output of the tag query to determine whether or not the tag in question is a don't care tag.

Considering the first product in the sum-of-products form of the tag query in FIG. 5A as an illustrative example, even when [(NOT tag1) AND (tag2) AND tag3] is changed to [tag1 AND tag2 AND tag3] by flipping tag1, the output of the tag query remains satisfied (see, e.g., the third product in the sum-of-products form of the tag query in FIG. 5A). The one or more processors may therefore determine that tag tag1 in the first product is an irrelevant or don't care tag. Based on the same type of process, the one or more processor may also determine that tag tag2 in the second product (e.g., [tag1 AND (NOT tag2) AND tag3]) is an irrelevant or don't care tag.

At block 138, the one or more processors may obtain one or more tag state options based on the canonical form and any don't care tags. For example, based on the operations described in connection with blocks 134 and 136 as applied to the example of FIG. 5A, the one or more processors may generate device tag states such as those in FIGS. 5B-5D, each corresponding to a different product in the sum-of-products form of the tag query.

If desired, the operations (e.g., at blocks 130, 132, 134, 136, and/or 138) described in connection with FIG. 8 may be performed between blocks 110 and 116 of FIG. 7.

The methods and operations described above in connection with FIGS. 1-8 may be performed by the components of one or more network devices and/or server or other host equipment using software, firmware, and/or hardware (e.g., dedicated circuitry or hardware). Software code for performing these operations may be stored on non-transitory computer-readable storage media (e.g., tangible computer-readable storage media) stored on one or more of the components of the network device(s) and/or server or other host equipment. The software code may sometimes be referred to as software, data, instructions, program instructions, or code. The non-transitory computer-readable storage media may include drives, non-volatile memory such as non-volatile random-access memory (NVRAM), removable flash drives or other removable media, other types of random-access memory, etc. Software stored on the non-transitory computer-readable storage media may be executed by processing circuitry on one or more of the components of the network device(s) and/or server or other host equipment (e.g., processing circuitry 22 for server 20, processing circuitry 42 on one or more network devices 10 or network controller devices 10, processing circuitry on administrator device 30, etc.).

The foregoing is merely illustrative and various modifications can be made to the described embodiments. The foregoing embodiments may be implemented individually or in any combination.

What is claimed is:

1. A method for tagging a network device using a management server for managing the network device, the method comprising:

obtaining, by the management server, a tag query that contains a plurality of tags, wherein the plurality of tags are usable for providing contextual information about the network device;

generating, by the management server, a device tag state based on the tag query, the device tag state indicating a state of each tag in the plurality of tags that collectively satisfies the tag query, wherein generating the device tag state based on the tag query comprises determining any tag in the plurality of tags that is irrelevant to satisfying the tag query;

tagging, by the management server, the network device based on the state of each tag in the plurality of tags indicated by the device tag state, wherein tagging the network device based on the state of each tag in the plurality of tags indicated by the device tag state comprises:

tagging the network device with any tag in the plurality of tags that, when present, satisfies the tag query; and removing, from association with the network device, any tag in the plurality of tags that, when absent, satisfies the tag query; and based on the device tag state, configuring, by the management server, the network device by providing a given device configuration for a given tag in the device tag state, over a corresponding network path, to the network device, wherein the network device comprises a packet processor.

2. The method defined in claim 1, wherein generating the device tag state based on the tag query comprises determining any tag in the plurality of tags that when present satisfies the tag query.

3. The method defined in claim 2, wherein generating the device tag state based on the tag query comprises determining any tag in the plurality of tags that when absent satisfies the tag query.

4. The method defined in claim 1, wherein the network device is configured by the management server based on the tagged network device satisfying the tag query.

5. The method defined in claim 4, wherein the plurality of tags contain at least one of a first tag indicative of a function of the network device, a second tag indicative of a physical location of the network device, or a third tag indicative of a networking context of the network device.

6. The method defined in claim 1, wherein the tag query is indicative of a Boolean expression that includes the plurality of tags as Boolean variables.

7. The method defined in claim 1 further comprising:

obtaining a request based on user input that identifies the tag query and the network device, wherein the tag query is obtained from the request.

8. The method defined in claim 1 further comprising:

obtaining a feature request that identifies the tag query and the network device, wherein the tag query is obtained from the feature request.

9. The method defined in claim 1 further comprising:

generating one or more additional device tag states based on the tag query, the one or more additional device tag states each indicating a state of each tag in the plurality of tags that collectively satisfies the tag query.

10. The method defined in claim 9 further comprising:

selecting the device tag state instead of the one or more additional device tag states for tagging the network device based on a criterion.

11. The method defined in claim 10 further comprising:

obtaining user input for tagging the network device, wherein the criterion is based on the user input.

12. One or more non-transitory computer-readable storage media comprising computer-executable instructions that, when executed by one or more processors for a network management system that manages a plurality of network devices in a network, cause the one or more processors to:

obtain a tag query containing a plurality of tags usable to label the plurality of network devices in the network;

generate a device tag state based on the tag query, the device tag state indicating a state of each tag in the plurality of tags and satisfying the tag query, wherein generating the device tag state based on the tag query comprises determining any tag in the plurality of tags that is irrelevant to satisfying the tag query;

associate a given network device in the plurality of network devices with any present tag indicated by the device tag state, wherein each present tag provides contextual information about the given network device;

dissociate the given network device in the plurality of network devices from any absent tag indicated by the device tag state, wherein each present tag, when associated with the given network device, and each absent tag, when disassociated from the given network device, collectively indicate that the tag query is satisfied for the given network device; and configure the given network device by conveying one or more device configurations, over a corresponding network path, to the given network device based on the device tag state.

13. The one or more non-transitory computer-readable storage media defined in claim 12 further comprising computer-executable instructions that, when executed by the one or more processors, cause the one or more processors to:

standardize the tag query to generate a standardized form of the tag query, wherein the device tag state is generated based on the standardized form of the tag query.

14. The one or more non-transitory computer-readable storage media defined in claim 12, wherein the plurality of tags contain at least one of a first tag indicative of a function of the given network device, a second tag indicative of a physical location of the given network device, or a third tag indicative of a networking context of the given network device.

15. A network management system comprising:

storage circuitry; and processing circuitry coupled to the storage circuitry and configured to:

obtain a tag query that contains a plurality of tags, wherein the plurality of tags are used to provide contextual information about a network device;

generate a network device tag state based on the tag query, the network device tag state indicating a state of each tag in the plurality of tags and satisfying the tag query, wherein the network device tag state is generated by identifying any tag in the plurality of tags that is irrelevant to satisfying the tag query; and tag the network device based on the state of each tag in the plurality of tags indicated by the network device tag state, wherein the network device is tagged by:

tagging the network device with any present tag, indicated by the network device tag state, that when present satisfies the tag query; and removing, from association with the network device, any absent tag, indicated by the network device tag state, that when absent satisfies the tag query; and based on the network device tag state, configure the network device by conveying, over a corresponding network path and to the network device, configuration data for forwarding network traffic.

16. The network management system defined in claim 15, wherein the processing circuitry is configured to obtain a canonical form of the tag query by evaluating the tag query using a plurality of combinations of input values for the plurality of tags.

17. The network management system defined in claim 16, wherein the processing circuitry is configured to identify any tag in the plurality of tags that is irrelevant to satisfying the tag query using the canonical form of the tag query.

18. The network management system defined in claim 17, wherein the network device tag state is generated based on the canonical form of the tag query and based on any identified tag in the plurality of tags that is irrelevant to satisfying the tag query.

* * * * *